United States Patent [19]

Spirer

[11] Patent Number: 4,921,010
[45] Date of Patent: May 1, 1990

[54] SWIVEL CONNECTOR
[75] Inventor: Steve Spirer, Haworth, N.J.
[73] Assignee: Unex Corporation, South Hackensack, N.J.
[21] Appl. No.: 183,565
[22] Filed: Apr. 22, 1988
[51] Int. Cl.[5] .............................................. F16K 17/00
[52] U.S. Cl. ..................................... 137/580; 285/136
[58] Field of Search ......................... 137/580; 285/136
[56] References Cited

U.S. PATENT DOCUMENTS

| 3,477,746 | 11/1969 | Watson | 285/136 X |
|---|---|---|---|
| 3,873,133 | 3/1975 | Berg et al. | 285/136 |
| 3,894,558 | 7/1975 | Pederson | 137/580 |
| 4,252,147 | 2/1981 | Gerber et al. | 137/580 |

FOREIGN PATENT DOCUMENTS 3016589  11/1981  Fed. Rep. of Germany ...... 137/580

Primary Examiner—John Fox
Attorney, Agent, or Firm—Michael J. Striker

[57] ABSTRACT

A swivel connector for supplying a fluid, comprises a first member having an axis and a cylindrical surface, the first member being provided with two separate first passages which open at the outer cylindrical surface at two axially spaced locations, and a second member having an inner cylindrical surface which defines an opening for receiving the outer cylindrical surface of the first member so that the members are swivelable relative to one another, the second member being provided with two second passages which are separate from one another and open at the inner cylindrical surface at two axially spaced locatyions substantially corresponding to the first mentioned axially spaced locations, and two circular grooves provided in at least one of the surfaces and each communicating one of the first passages with a respective one of the second passages.

12 Claims, 2 Drawing Sheets

SWIVEL CONNECTOR

BACKGROUND OF THE INVENTION

The present invention relates to swivel connectors for supplying a fluid to a consumer, for example, for supplying a fluid to fluid-operated tools.

Swivel connectors for the above mentioned application are known in the art. The known swivel connectors include two swiveling connecting parts to which fluid lines are attached. When these two swiveling connecting parts are next to each other and a consumer, such as a tool, is turned by 180°, the conduits such as for example hoses prevent further turning and tangle up, making therefore the handling of the tool very difficult if not impossible at all.

SUMMARY OF THE INVENTION

Accordingly, it is an object of the present invention to provide a swivel connector which eliminates the disadvantages of the prior art.

In keeping with these objects and with others which will become apparent hereinafter, one feature of the present invention resides, briefly stated, a swivel connector which comprises a first member having an axis and an outer cylindrical surface, the first member being provided with two separate first passages which open at the outer cylindrical surface at two axially spaced locations, and a second member having an inner cylindrical surface which defines an opening for receiving the outer cylindrical surface of the first member so that the members are swivelable relative to one another, the second member being provided with two second passages which are separate from one another and open at the inner cylindrical surface at two axially spaced locations substantially corresponding to the first mentioned axially spaced locations, and two circular grooves provided in at least one of the surfaces and each communicating one of the first passages with a respective one of the second passages.

When the swivel connector is designed in accordance with the present invention, the consumer such as a tool can turn over 360° without tangling up the hoses and therefore making it easier for the operator to apply any type of fluid-operated tool that runs off two lines.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
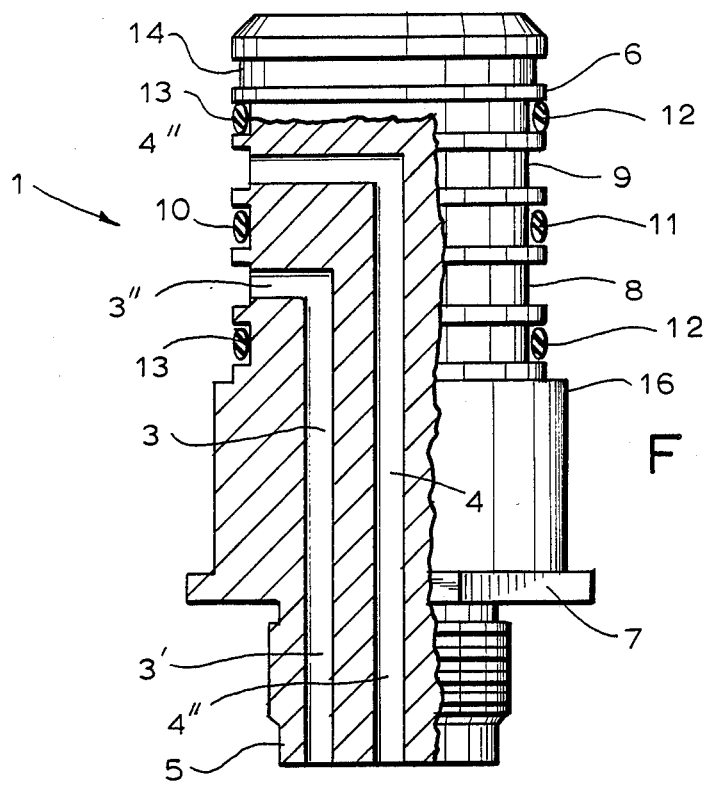
FIG. 2 is a cross-section showing a first member of the swivel connector in accordance with the present invention.
Figure 1:
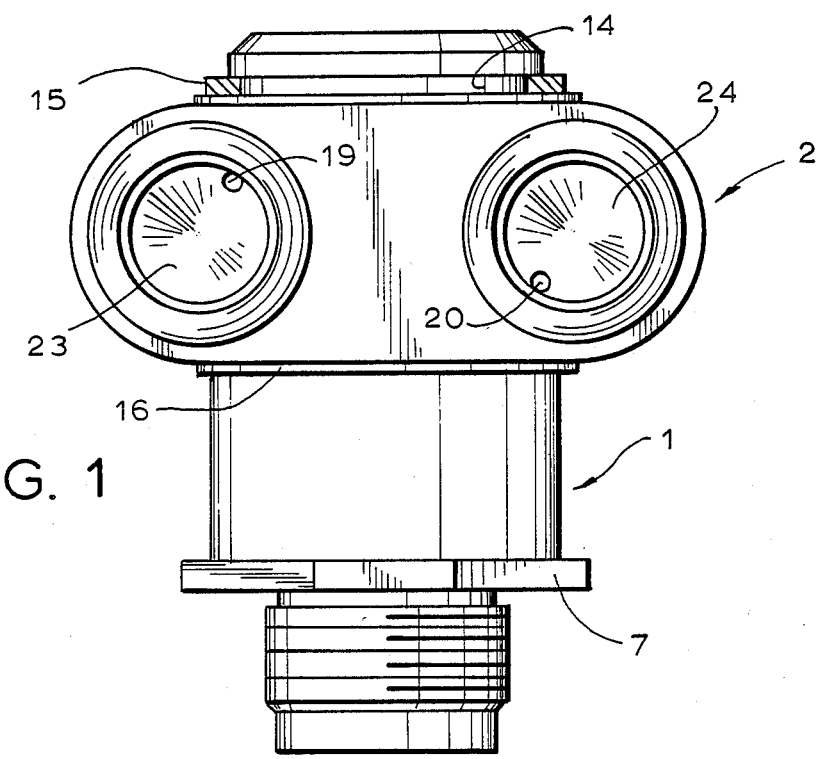
FIG. 1 a perspective view of a swivel connector in accordance with the present invention.
Figure 3:
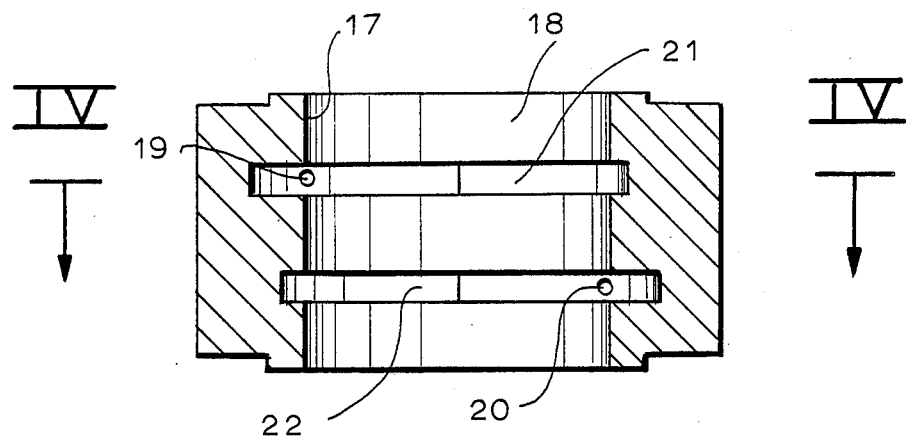
FIG. 3 is a section of a second member of the swivel connector in accordance with the present invention.
Figure 4:
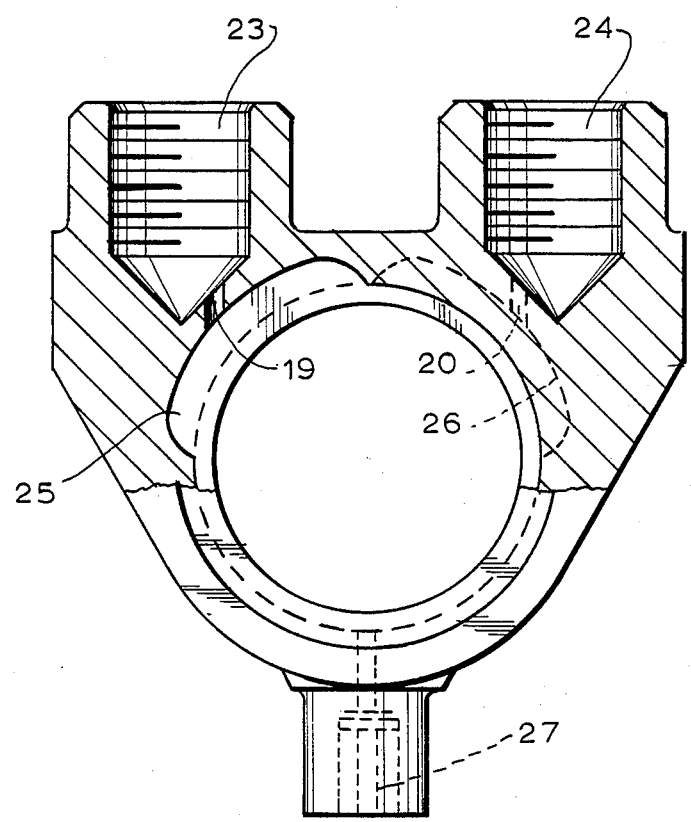
FIG. 4 is a view showing a section of the second member, taken along the line IV—IV in FIG. 3.

A swivel connector in accordance with the present invention has a first member which is identified with reference numeral 1 and a second member which is identified with reference numeral 2. The first and second members are swivelingly connected with one another as will be explained in detail hereinbelow.

The first member has two passages 3 and 4 each having a substantially axial passage portion 3' and 4', and a substantially radial passage portion 3" and 4". The axial passage portions 3' and 4' open at their one end outwardly of an end part 5 of the first member 1. At their opposite ends the axial passage portions 3' and 4' are connected with the above mentioned radial passage portions 3" and 4". The radial passage portions 3" and 4" open at a cylindrical outer surface 6 of the first member 1. The end part 5 of the first member 1 is provided with a thread for attaching to a consumer, for example a fluid-operated tool. A hexagonal projection 7 can be used for mounting the tool by screwing the end part 5 into a respective threaded opening of the fluid-operated tool. The first member 1 is provided with two circular grooves 8 and 9 which are formed in the outer cylindrical surface 6 and each continuously extending over the surface so as to be peripherally closed. The above mentioned radial passage portions 3" and 4' actually open into the circular grooves 8 and 9.

A sealing groove 10 is provided between the circular grooves 8 and 9 and accommodates a sealing member, for example an O-ring 11. Two further sealing grooves 12 are provided at the axially outer sides of the circular grooves 8 and 9 and accommodate further sealing members 13 formed for example as O-rings. An additional groove 14 is formed in the opposite end of the first member 11 for accommodating a snap ring 15. Finally, the first member 1 has a retaining abutment 16.

The second member 2 has an inner cylindrical surface 17 which limits an inner opening 18 for receiving the main portion of the first member 11. The second member 2 has two substantially transverse passages 19 and 20. Two circular grooves 21 and 22 are formed in the inner surface 17 of the second member 2 at axially spaced locations which substantially correspond to the locations of the grooves 8 and 9 of the first member 1. The transverse passages 19 and 20 have expanded passage portions 23 and 24 which are provided with threads for connecting to a source of fluid. The opposite ends of the transverse passages 19 and 20 are open into the circular grooves 21 and 22 respectively. More particularly, these opposite ends of the passages 19 and 20 communicate with the grooves 21 and 22 through expanded portions 25 and 26. Finally, the second member 2 is provided with a pressure relief valve 27 which communicates with at least one groove 21, 22 or both these grooves.

In order to assemble the swivel connector the second member 2 is fitted onto the main portion of the first member 1, so that the lower end of the second member 2 abuts against the retaining abutment 16, while the upper end is retained by the snap ring 15 inserted in the groove 14. A fluid is supplied to a consumer through the line 23, 19, 25, 21, 9, 4", 4', and can be withdrawn from the consumer through the line 3', 3", 8, 26, 22, 26, 20, 24. The consumer such as a tool which is fixedly attached to the first member 1 through the end part 5, can turn 360° about the axis together with the first member 1, and no tangling up of the hoses connected to the passage portions 23, 24 of the second member 2 will occur.

It is believed to that understood that the circular grooves 8, 9; 21, 22 do not have to be provided in both first member 1 and second member 2. The circular grooves can be formed only in one of these members. The passages 3, 4; 19, 20 can be formed in many different ways and extend over different routes than those shown in the drawings.

It will be understood that each of the elements described above, or two or more together, may also find a useful application in other types of constructions differing from the types described above.

While the invention has been illustrated and described as embodied in a swivel connector for supplying a fluid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A swivel connector for supplying a fluid, comprising a first member having an axis and an outer cylindrical surface, said first member being provided with two separate first passages which open at said outer cylindrical surface at two axially spaced locations; a second member having an inner cylindrical surface which defines an opening for receiving said outer cylindrical surfaces of said first member so that said members are swivelable relative to one another, said second member being provided with two second passages which are separate from one another and open at said inner cylindrical surface at two axially spaced locations substantially corresponding to said first mentioned axially spaced locations; two circular grooves provided in at least one of said surfaces and each communicating one of said first passages with a respective one of said second passages; a pressure relief valve arranged to relieve a pressure of fluid when it exceeds a predetermined value, said pressure relief valve being arranged in said second member and communicating with at least one of said circular grooves.

2. A swivel connector as defined in claim 1, wherein said grooves are formed on said outer cylindrical surface of said first member.

3. A swivel connector as defined in claim 1, wherein said grooves are formed in said inner cylindrical surface of said second member.

4. A swivel connector as defined in claim 1, wherein each of said grooves includes a first groove portion formed in said first member and a second groove portion formed in said second member, said first and second groove portions being open into and arranged in alignment with one another.

5. A swivel connector as defined in claim 1, wherein each of said first passages includes a substantially axial passage portion and a substantially radial passage portion which communicates with said substantially axial passage portion and opens on said cylindrical outer surface of said first member.

6. A swivel connector as defined in claim 1, wherein each of said second passages is formed as a substantially radial passage.

7. A swivel connector as defined in claim 1, wherein each of said second passages has an end which communicates with a respective one of said circular grooves and is provided with an enlarged end portion.

8. A swivel connector as defined in claim 1; and further comprising sealing means including a sealing groove located axially between said circular grooves; and a seal arranged in said sealing groove.

9. A swivel connector as defined in claim 1; and further comprising sealing means including two sealing grooves each located at an axially outer side of a respective one of said circular grooves; and two sealing members each located in a respective one of said sealing grooves.

10. A swivel connector as defined in claim 1, wherein each of said second passages has a main passage portion with a predetermined diameter and opening into a respective one of said grooves, and an inlet passage portion which has a diameter greater than the diameter of said main passage portion and is provided with a thread for connecting to a source of fluid.

11. A swivel connector as defined in claim 1; and further comprising means for axially retaining said first and second members with one another, said retaining means including a retaining abutment, a retaining groove axially spaced from said retaining abutment, and a retaining member received in said retaining groove, so that when said second member is arranged on said first member and a first axial end of said second member abuts against said retaining abutment, said retaining member engages a second axial end of said second member and retains the latter.

12. A swivel connector for supplying a fluid as defined in claim 1, wherein, each of said second passages has an end which communicates with a respective one of said circular grooves and is provided with an enlarged end portion.

* * * * *